United States Patent [19]

Lombard

[11] 4,381,679

[45] May 3, 1983

[54] PICK-UP FOR THE MEASUREMENT OF THE VELOCITY OF AN IONIZATION GAS

[75] Inventor: Claude Lombard, Le Chesnay, France

[73] Assignee: Regie Nationale des Usines Renault, Boulogne-Billancourt, France

[21] Appl. No.: 193,298

[22] Filed: Oct. 2, 1980

[30] Foreign Application Priority Data

Oct. 10, 1979 [FR] France .................................. 79 25174

[51] Int. Cl.$^3$ ............................ G01F 1/64; G01F 1/70
[52] U.S. Cl. ................................... 73/861.05; 73/118; 73/861.09
[58] Field of Search ................. 73/118, 861.05, 861.09

[56] References Cited

U.S. PATENT DOCUMENTS 3,732,854  5/1973  Murtin ......................... 73/861.09 X
4,152,935  5/1979  Nagaishi et al. .................. 73/861.05

FOREIGN PATENT DOCUMENTS 2039488  2/1972  Fed. Rep. of Germany .

OTHER PUBLICATIONS

IBM Technical Disclosure Bulletin, vol. 18, No. 10, Mar. 1976, pp. 3469–3470.

Primary Examiner—Charles A. Ruehl
Attorney, Agent, or Firm—Oblon, Fisher, Spivak, McClelland & Maier

[57] ABSTRACT

A pick-up for measuring the velocity of a gas by ion transit time including a coupling positioned between a valve for the gas, the velocity of which is to be measured and an electrode serving to measure the transit time inside a conduit delimiting the gaseous discharge. This pick-up can be used to measure the velocity of discharge gases at the intake of the cylinders of an internal combustion motor.

7 Claims, 1 Drawing Figure

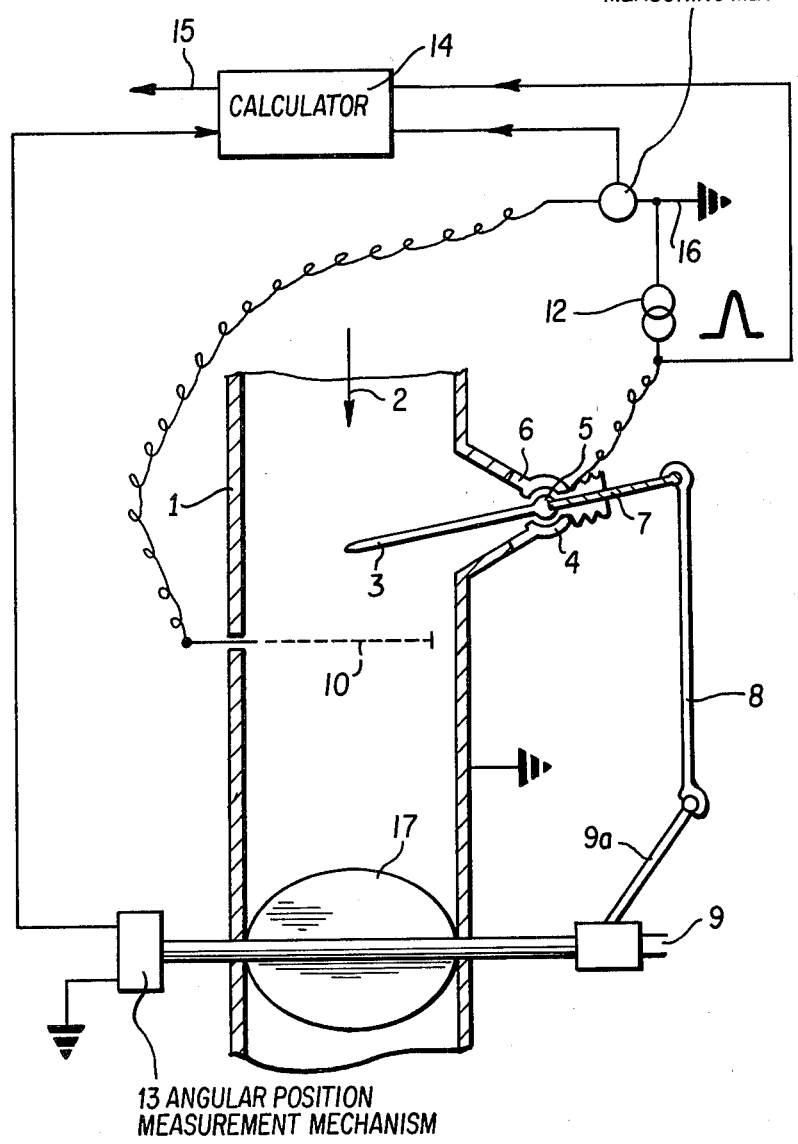

PICK-UP FOR THE MEASUREMENT OF THE VELOCITY OF AN IONIZATION GAS

BACKGROUND OF THE INVENTION

1. Field of the Invention

The present invention relates to a pick-up for measuring the velocity of a gas based on an ionization phenomenon and, more particularly, to a pick-up for measuring the air supply speed at the cylinder intake of an internal combustion engine by ion transit time.

2. Description of the Prior Art

French patent application No. 78/29.884, filed by the applicant on Oct. 20, 1978, for a "Device for measuring the fill volume of air in a motor", remarkable relative to measuring the quantity of air R necessary to fill the cylinders of an internal combustion engine, is known, and such device uses, in combination:

a mechanism for measuring the air flow velocity inside an inlet manifold which is an anemometer of the transit time, having two electrodes, associated with a high tension impulse generator;

a mechanism for releasing the impulse generator (triggger) attached at an angular position of the main shaft and a mechanism for complex calculation, incorporating specifically a micro-calculator which makes it possible to carry out the measurement or the target (privileged) times to obtain the quantity R.

Thus, a pick-up for measuring the velocity of gas and, specifically, of air in which a first electrode ionizes the gas and one or more other electrodes, receptacles, gathers a portion of the ions with a delay proportional to the distance and the velocity.

If one wants to use the device for the air admitted at the intake of an internal combustion engine with an air valve, there are certain problems in obtaining a very precise device because the total length arrangement of the measurement base and the response velocity is not always easy to optimize, particularly when there is rapid intake valve movement. When the motor turns very rapidly, and when intake is finished at a position corresponding to the idle speed setting, very little air continues to enter the motor, which signifies a weak velocity in the measuring organ in front of the valve.

The same problem may occur in measurements of other than internal combustion engines if there is a large velocity pressure and when it is controlled by a valve.

SUMMARY OF THE INVENTION

The present invention has as its object a remedy of the functional difficulty encountered with the prior art. Such is characterized by a coupling between the length of the measurement base, i.e. the distance between electrodes being made very short when the valve is about to close. It then becomes necessary to add a device to measure the distance between electrodes.

The ratio of transit time/variable base length may then be calculated and made known with the aid of a microcalculator connected to the device.

BRIEF DESCRIPTION OF THE DRAWING

The invention will be described with the aid of the attached single drawing presenting by way of non-limiting example, a device according to the invention.

DETAILED DESCRIPTION OF THE PREFERRED EMBODIMENT

In the air intake passage or conduit 1 one sees proceeding from the air inlet 2 a mobile ion emission electrode 3 pivoting in a joint 4 which simultaneously provides air tightness and electrical contact. This may be accomplished in particular by a joint 5 of conductive rubber, enclosed in a piece 6 which insulates electrode 3 from conduit 1. An insulated shaft or stem 7 extending from electrode 3 is connected by a link 8 to an extension 9a of the gas valve 17 which coordinates the movements of valve 17 and the electrode 3 by means of which the distance with respect to the ion collecting electrode 10 is thus made variable.

The electrode 10 is connected by a current or tension measuring mechanism 11 to ground 16 and to a high tension pulse generator 12 whose opposite end is conected to the mobile electrode 3. A mechanism 13 for measuring the angular position of the valve 17 is attached to shaft 9. This may, for example, be a resistor track potentiometer or a commercial optical coder.

The angle information sampled at mechanism 13 is one measure of the distance between the electrodes 3 and 10 across the linkage of lever arms 7, 8, 9a. Such is transmitted to a calculator 14 where it is submitted, in relation to the information coming from the emission of ions, to operation of the high tension pulse generator 12 so that, upon detecting the passage of ions at electrode 10, it is transformed into an electrical signal that can be used at measuring mechanism 11. The calculator 14 may be of any type known to a person of skill in the art, particularly a numerical type micro-processor. The calculator 14 determines the ratio T/d, T being the transit time and d the distance between electrodes. The result given as represented by line 15 is the velocity of the air inside conduit 1.

The detector device can be placed directly at the level of the shaft or stem 7 or again optically detect the position of the electrode 3 without changing the characteristics of the invention. Similarly the coupling between the electrode 3 and the valve 17 may not be partial and may not react, for example, except to valve positions approaching closure. One should also note that the characteristics of valve 17 do not influence the measurement precision, which is determined only by the distance between the electrodes 3 and 10.

The function under the most critical conditions is as follows: when valve 17 is open and the velocity of the motor speed increases, the discharge at air inlet 2 is important and the velocity of the air is rapid, i.e. the transit time of ions between the electrodes 3 and 10 is short. If valve 17 is suddenly shut, electrode 3 equalizes itself with electrode 10 and, notwithstanding a strong air velocity, reduces the transit time of the ions, remaining within the acceptable limits compared to the duration of a half rotation cycle of the motor.

Other embodiments are possible, for example, electrode collector 10 may be mobile instead of emitter electrode 3 or it is possible to attach the electrode 3 directly to valve 17. Therefore, obviously numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A pick-up for measuring the velocity of a gas comprising:
   a conduit through which the gas flows;
   a valve member mounted in said conduit;
   at least one gas ionization electrode positioned in said conduit for emitting ions;
   at least one measurement electrode positioned at a certain distance within said conduit from said at least one gas ionization electrode;
   a source of pulsating high voltage power connected to said gas ionization electrode;
   means for measuring the distance between said gas ionization electrode and said measurement electrode;
   means for measuring transit time of said ions from said gas ionization electrode to said measurement electrode and for calculating the velocity to the gas from the measured transit time and the measured distance between said gas ionization electrode and said measurement electrode; and
   position coupling means interconnecting said valve member and one of said electrodes for variably positioning said one of said electrodes in response to movement of said valve member.

2. A pick-up according to claim 1, further comprising means for pivotably mounting said one of said electrodes to said conduit and for fixably mounting the remaining electrode to said conduit.

3. A pick-up according to claim 2, wherein the pivotably mounted electrode is disposed inside of the conduit upstream of the valve member and is movable inside the conduit in the direction of gas flow.

4. A pick-up according to claim 2, wherein said position coupling means further comprises means for moving said one of said electrodes to a position adjacent the remaining electrode when the valve member is closed.

5. A pick-up according to claim 2, wherein said conduit further comprises a joint portion and wherein the position coupling means further comprises a shaft having a joint formed thereon and mounted within said joint portion of said conduit.

6. A pick-up according to claim 1, wherein said position coupling means further comprises a first shaft member connected to said gas ionization electrode, a second shaft member connected to said valve member, an extension member pivotably connected to said second shaft, and a link member pivotably interconnecting said first shaft and said extension member.

7. A pick-up according to claim 1, wherein the means for measuring the distance between said gas ionization electrode and said measurement electrode further comprises means for measuring the angular position of said valve member interconnecting said valve member and said means for calculating the velocity of the gas.

* * * * *